Oct. 23, 1956 W. F. COUSINO 2,767,609
SPRING URGED NUT HAVING OUTWARDLY
PROJECTING TEETH THEREON
Filed June 24, 1952
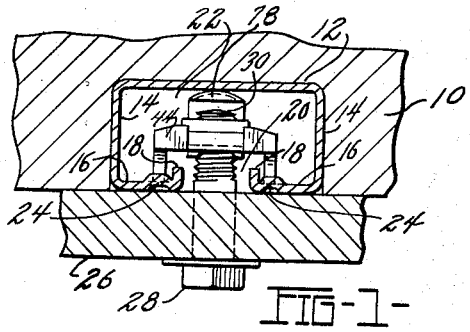
FIG-1-
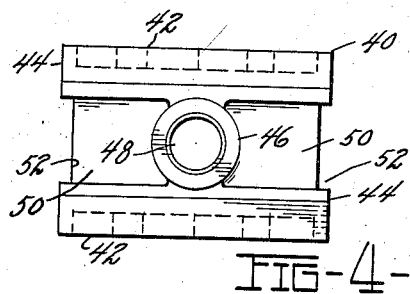
FIG-4-
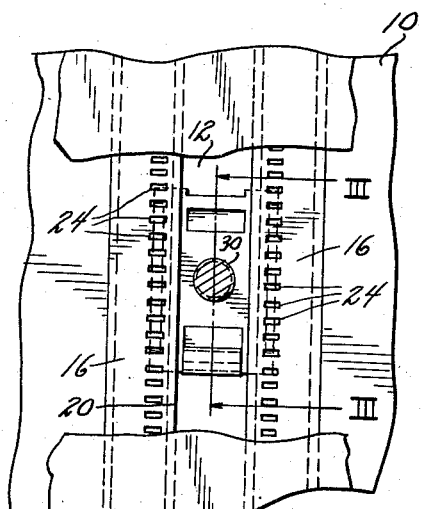
FIG-2-
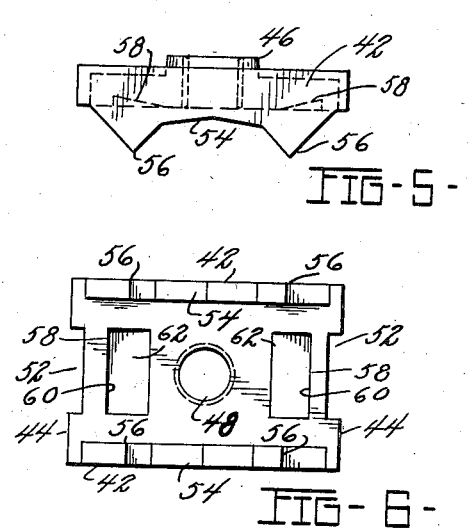
FIG-5-
FIG-6-
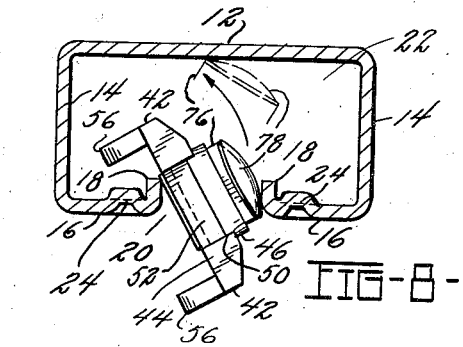
FIG-8-
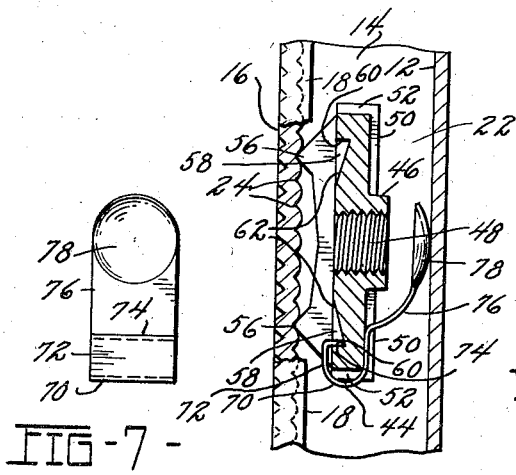
FIG-7-
FIG-3-
INVENTOR:
Walter F Cousino.
BY
Wm O Ballard
his attorney

United States Patent Office 2,767,609
Patented Oct. 23, 1956

2,767,609
SPRING URGED NUT HAVING OUTWARDLY PROJECTING TEETH THEREON

Walter F. Cousino, Toledo, Ohio, assignor to Ex Corporation, Toledo, Ohio, a corporation of Ohio Application June 24, 1952, Serial No. 295,216

4 Claims. (Cl. 85—32)

This invention relates to nuts, more particularly of the type which may be inserted into a support and held in position to receive a bolt.

An object of this invention is to provide a nut incorporating means to hold said nut in a predetermined position within a structure to receive a bolt.

Another object of this invention is to provide readily attachable spring means for the nut including guides for attaching the spring means and securely anchoring the same against accidental or inadvertent removal.

And another object of this invention is to provide a nut which may be readily placed and held in bolt receiving position within a frame, adjusted to predetermined locations within the frame, and have a bolt attached thereto, all from the same station adjacent the frame.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a section through a channel element of a construction frame showing a nut of the invention positioned therein;

Fig. 2 is a view of the channel element, looking from the bottom of Fig. 1, parts being broken away;

Fig. 3 is a view on the line III—III, Fig. 2;

Fig. 4 is a plan view of the nut;

Fig. 5 is a side elevation of the nut;

Fig. 6 is a plan view of the opposite side of the nut as shown in Fig. 4;

Fig. 7 is a plan view of a spring finger element used in association with the nut; and Fig. 8 is a view similar to Fig. 1, illustrating the method of assembly of the nut into a channel element.

In the construction of walls, ceilings, floors, partitions, bulkheads and the like, the frame-work therefor may be fabricated from channel sections supported by a suitable foundation 10. These channel sections embody a cross-sectional contour defined by a base or back plate section 12 from the longitudinal edges of which, extend opposing side portions 14 having offsets 16 directed toward each other and terminating in flanges 18 providing a throat or clearway 20 therebetween. This provides a general C-shape for the cross-section about a T-shaped slot or slideway 22, incorporating the clearway 20 as one leg thereof. In the production of these rolled channel sections, a series of closely and regularly spaced seats 24 are formed along the offsets 16, parallel to and on each side of the throat 20.

Panels or other structural parts 26 may be attached to the frame work formed by the channel members by means of bolts 28 passing therethrough with their threaded shanks 30 extending through the clearway 20 to engage nuts prepositioned therein through operation of the invention herein.

A nut of the invention herein comprises a body 40 herein shown as being of general rectangular form with major sides 42 and minor sides or ends 44. Centrally of and on one side of the body 40, there is an integral hub 46 having a threaded bore 48 axially therethrough to engage a bolt shank 30.

Extending from the hub 46, in opposite directions therefrom, are grooves 48 which continue across the ends 44 to provide seats 52 centrally of the ends, their utility being hereinafter more fully described.

On the opposite side of the body 40, that is the side away from the hub 46, the major sides 42 are provided with coincidental flanges 54 having intermediate projections or teeth 56. These teeth 56 are triangular in shape and have their apices spaced apart a distance which is a multiple of the distance between two of the regularly spaced adjacent seats 24.

The side of the nut carrying the flanges 54 is also provided with a seat 58 between the flanges 54 and parallel to and adjacent each edge 44. These seats include a face 60 extending at right angles inwardly from the plane of the side and a face 62 extending from the inner depth of the face 60 angularly to the outer surface of the nut toward the bore 48.

Spring means are provided to be attached to the nuts and are herein shown as strips of spring metal, each configured to include a U-shaped intermediate portion 70 with a minor leg 72 extending from the bow of the U-shaped portion to terminate in an abrupt offset 74. The other or major leg extends to provide a spring finger 76 having a dome-shaped or spherical segment terminus 78.

In use, a spring clip element and a nut are selected and the spring element is attached to the nut by having the U-shaped portion 70 encircle an end 44 and having the offset 74 snap engage the seat 58 as guided into and securely held in position by a groove 50 and end recess 52. The spring finger 76 extends outwardly from the nut body to position the terminus 78 in substantially axial alignment with the bore 48.

When the spring element has been snapped into place on the nut body, the resulting unit is ready to be inserted into a frame channel section. This may be accomplished by a rolling motion (Fig. 8) of the nut through the channel throat 20. The spring finger 76 may be manually flexed toward the nut body at the start of the assembly operation. When the nut has fully entered the channel way 22, the spring finger 76 will engage the channel back 12 and urge the teeth 56 into engagement with seats 24. The nut may be manually engaged by a finger inserted through the throat 20 and shifted longitudinally within the channel to have the nut positioned therewithin at a predetermined location. This locates the bore as desired and as many of the nuts as deemed necessary may be so located at predetermined positions along the frame.

The panels 26 or other structural items may be attached to the frame by having bolts extending therethrough to have their shanks 30 register with the bores 48 and screwed thereinto.

All the mounting operations may be accomplished from one side of the frame work and the dome-shaped terminus 78 of the spring serves as a bearing in mounting the nuts and prevents the springs from being snapped out of position during the nut locating operations.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and desired to secure by United States Letters Patent:

1. A nut of the class described embodying a body having sides, ends and a threaded bore intermediate said sides and ends, a plurality of transverse teeth outwardly projecting from each side portion of said body in a direction parallel to said sides, and a clip snap embracing one of the ends and having a spring finger extending in the opposite direction from said teeth, said spring finger terminating in substantial alignment with said bore.

2. The structure set forth in claim 1 wherein the end embraced by said clip is provided with a seat to definitely locate said clip in relation to said nut body.

3. The structure set forth in claim 1 wherein the free end of said spring finger is dome-shaped.

4. The structure set forth in claim 1 wherein said nut body is provided with a seat adjacent said clip embraced end and said clip is provided with an offset to engage said seat to lock the clip onto the nut body.

References Cited in the file of this patent

UNITED STATES PATENTS

| | | |
|---|---|---|
| 131,299 | Polley | Sept. 10, 1872 |
| 1,197,052 | Newhall | Sept. 5, 1916 |
| 1,552,702 | Irish | Sept. 8, 1925 |
| 1,740,535 | Bramming | Dec. 24, 1929 |
| 1,924,884 | Schaffert | Aug. 29, 1933 |
| 1,933,536 | Awbrey | Nov. 7, 1933 |
| 2,332,766 | Von Gehr | Oct. 26, 1943 |
| 2,345,650 | Attwood | Apr. 4, 1944 |
| 2,531,352 | Churchill | Nov. 21, 1950 |
| 2,627,567 | Bell | Feb. 3, 1953 |
| 2,676,680 | Kindorf | Apr. 27, 1954 |
| 2,703,663 | Connett | Mar. 8, 1955 |